United States Patent Office 3,785,929
Patented Jan. 15, 1974

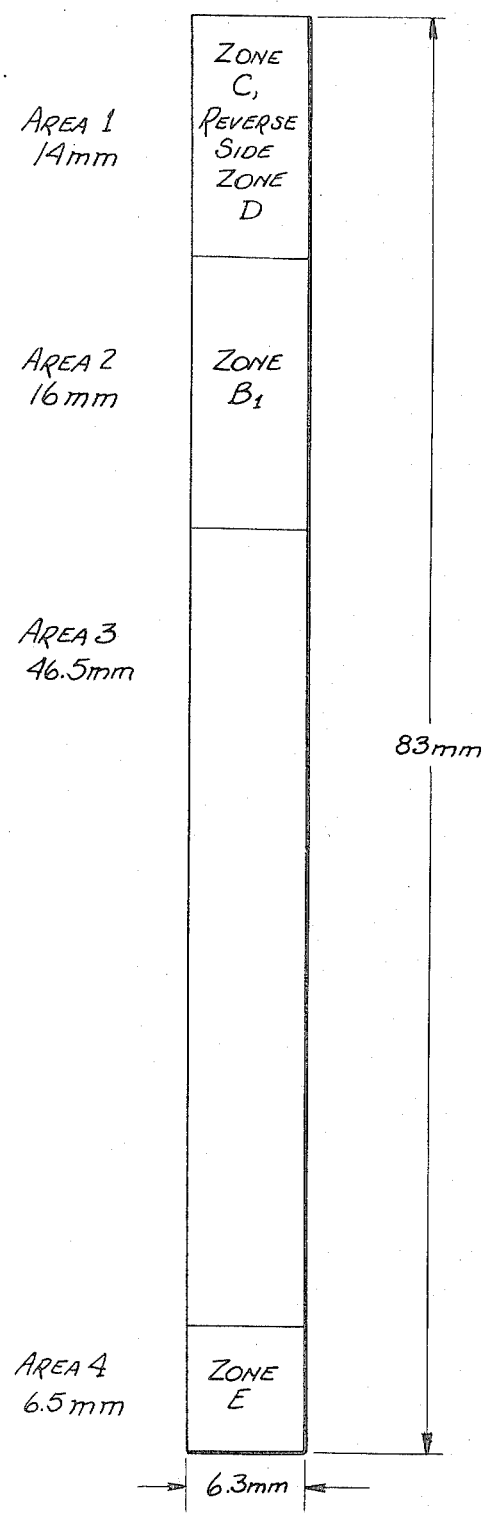

3,785,929
DIAGNOSTIC COMPOSITION FOR THE DETECTION OF NITRITE
Donald P. Kronish, Rockaway, and William D. Young, Jr., Montclair, N.J., assignors to Warner-Lambert Company, Morris Plains, N.J.
Continuation-in-part of application Ser. No. 836,089, June 24, 1969, now Patent No. 3,645,853. This application Nov. 30, 1971, Ser. No. 203,289
The portion of the term of the patent subsequent to Feb. 28, 1989, has been disclaimed
Int. Cl. C12k 1/04
U.S. Cl. 195—100           12 Claims

ABSTRACT OF THE DISCLOSURE

A diagnostic composition for the detection of the presence of nitrite comprises a carrier material impregnated in a specific zone with a dried form of two stable reagent solutions. In the preferred embodiment, the carrier material is also impregnated with a dried barrier composition and an identifying dye. In use, the two zones containing the reagents are inserted into the fluid being tested and the positive presence of nitrite is indicated in 10 minutes or less by the formation of color in the reagent zones. The diagnostic composition of this invention provides a rapid, easy-to-use method for the detection of the presence of bacteriuria.

CROSS REFERENCE TO RELATED APPLICATION

This application is a continuation-in-part of United States Ser. No. 836,089, filed June 24, 1969, now U.S. Pat. 3,645,853.

BACKGROUND OF THE INVENTION

The taxonomic value of the nitrate reduction test for the identification and differentiation of micro-organisms which are phathogenic to humans is well known. The Enterio-baceriaceae family react positively to the nitrate reduction test. Certain bacteria reduce nitrate to nitrite only while others continue the reduction and transform nitrite compounds into free nitrogen or ammonia.

In spite of its value, the utility of the nitrate reduction test in the clinical laboratory has been limited, due primarily to the fact that the time required to obtain results is too long to be of real value. Furthermore, known test methods require the careful preparation of necessary reagents immediately prior to use.

DESCRIPTION OF PRIOR ART

Procedures for the determination of the ability of bacteria to reduce nitrate to nitrite are known. In the classical test, a nutrient medium containing potassium nitrate (nitrite free) is inoculated with a pure culture of the strain under examination and incubated at 37° C. for 24 hours. The medium is tested for the presence of nitrites by adding 0.1 ml. of a mixture of test reagents prepared from 0.8% w./v. sulfanilic acid in 5 N acetic acid; and 0.5% w./v. α-naphthylamine (1-aminonaphthalene) in 5 N acetic acid. These reagents are mixed together immediately before use. The development of a distinct pink or red color in the test medium, after the addition of the mixture of reagents, indicates the presence of nitrite produced from the original nitrate ("Identification of Enterobacteriaceae," P. R. Edwards and W. H. Ewing, Burgess Pub. Co., 1962, printed 1964).

Another work ("Quicker Bacteriological Results," R. H. Weaver, Am. J. Med. Tech., 20: 14–26, 1954) indicates that an incubation period of 15 minutes is possible using a medium containing peptone, beef extract, and potassium nitrate; however, the usual nitrite reagents must still be added to obtain color development as an indication that the reduction of nitrate to nitrite has taken place.

Thus, it it can be seen that while some progress has been made, prior art methods still involve painstaking preparation of critical test reagents which can only be mixed immediately prior to use. The prior art procedures all have the disadvantage that they require a considerable amount of knowledge and a high degree of skill in order to obtain reliable, reproducible test results.

OBJECTS OF THE PRESENT INVENTION

It is the object of this invention to provide an improved diagnostic composition for the rapid identification and differentiation of microorganisms which reduce nitrate to nitrite.

Another object of this invention is to provide a diagnostic composition in which all the required nutrients and reagents for said differentiation test are provided in a premeasured, stable, easy-to-use, dry form.

It is still another object of this invention to provide a diagnostic composition in which all the required nutrients and test reagents are incorporated on a single carrier support material.

It is a further object of this invention to provide a rapid, sensitive and accurate test procedure for the identification of bacteria which utilizes the diagnostic composition of FIG. 1 of this invention but which requires only about 2 hours for completion.

It is an additional object of this invention to provide a rapid, stable, easy-to-use diagnostic composition as shown in FIG. 2 of this invention, wherein dried reagents, impregnated on a carrier support material, will detect minute quantities of nitrite in fluid systems in 10 minutes or less.

Other objects will appear from the following detailed description.

SUMMARY OF THE INVENTION

A rapid, stable, easy-to-use diagnostic composition for the detection of minute quantities of nitrite in fluids such as urine, is provided in the form of an impregnated carrier material. The use of the composition of this invention makes it possible to detect the positive presence of minute amounts of nitrite in a fluid system. The diagnostic composition provided is stable for at least 12 months at room temperature.

DESCRIPTION OF THE DRAWINGS

In the accompanying drawings.

FIG. 2 is a diagrammatic representation of an alternate bibulous test strip of this invention impregnated with Zone C reagent on one side of area 1, Zone D reagent on the reverse side of area 1, Zone $B_1$ hydrophobic barrier in area 2, and Zone E Dye in area 4; area 3 is untreated.

DESCRIPTION OF THE PREFERRED EMBODIMENTS

Figure 1:
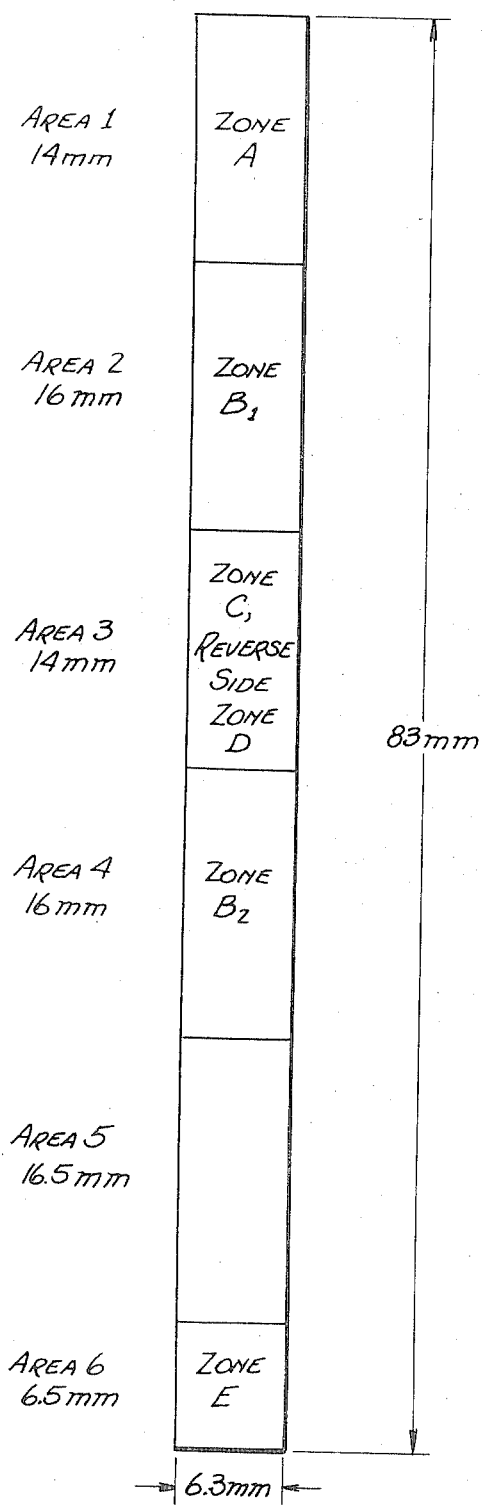
FIG. 1 is a diagrammatic representation of a bibulous test strip of this invention impregnated with Zone A nitrate medium in area 1, Zone $B_1$ hydrophobic barrier in area 2, Zone C reagent on one side of area 3, Zone D reagent on the reverse side of area 3, Zone $B_2$ hydrophobic barrier in area 4, and Zone E Dye in area 6; area 5 is untreated.

The diagnostic composition of this invention, as seen in FIG. 1 of the drawings, is prepared by impregnating certain specified areas of a bibulous carrier material with a solution of a nitrate-containing medium (hereinafter designated Zone A Nitrate Medium) and stable reagent solutions (hereinafter designated Zone C and Zone D reagents), wherein the nitrate medium is separated from the reagent zone area by a hydrophobic barrier composition (hereinafter designated Zone $B_1$ Hydrophobic Barrier), and allowing the impregnated solutions to dry. An additional barrier zone, an untreated area and a dyed identification zone are optionally present in the preferred diagnostic composition.

The aforementioned impregnated bibulous carrier material is cut into individual strips containing sufficient quantities of all the ingredients necessary for the identification and differentiation of micro-organisms by their ability to reduce nitrate to nitrite.

The Zone A nitrate-containing medium can be any composition containing a non-toxic nitrate salt alone, or, preferably in combination with a nutrient medium such as peptone. A preferred medium for example, is prepared by forming an aqueous solution of beef extract, peptone and potassium nitrate. A particularly preferred medium of this type, marketed as Bacto-Nitrate Broth (dehydrated) by Difco Laboratories, Detroit, Michigan, contains these components in a ratio of 3 g. of beef extract, to 5 g. of peptone and 1 g. of potassium nitrate. It has been found that a 100 ml. distilled water solution of from about 10 to 27 g. of dehydrated Bacto-Nitrate Broth is quite suitable for use in the preparation of the diagnostic composition of this invention.

As the Zone $B_1$ hydrophobic barrier, the composition used is one which will prevent the premature leaching of the culture during incubation upward into the reagent zone.

The barrier composition must, of course, be chemically and biologically inert in this test system. Any substance which will form a waterproof barrier of this type may be used. Suitable materials include waxes, lacquers, and plastics, particularly that colorless polymerized methyl methacrylate coating composition marketed by Krylon, Inc., Norristown, Pa. under the trade name Krylon 150 Crystal Clear. The Krylon material is particularly preferred. It is supplied in a toluene vehicle and may be diluted for ease of application with additional toluene or other diluents, such as ethyl, methyl, or propyl alcohol USP.

It has been found that a barrier solution prepared from about 75 to 100 ml. of Krylon and to which is added 0 to 25 ml. of diluent is suitable.

Two reagent zones are provided on the diagnostic test product of this invention. Zone C reagent contains an alkali metal salt of an amino-substituted-naphthalene sulfonic acid and an alkali metal salt of sulfanilic acid or, alternately, sulfadiazine or an alkali metal salt of sulfathiazole while Zone D reagent contains a crystalline acid such as oxalic, malonic or citric acid. The amino-substituted-naphthalene sulfonic acid may, for example, be 5-amino-2-naphthalene sulfonic acid, 8-amino-2-naphthalene sulfonic acid or 5-amino-1-naphthalene sulfonic acid, with the 5-amino-1-naphthalene sulfonic acid preferred among the three acids. As the salt of sulfanilic acid, the sodium salt is preferred. The two reagent impregnated zones are positioned adjacent to each other on the individual diagnostic test product, either in a side-by-side relationship on the same side of the carrier material or, preferably, positioned back-to-back with one of the reagent solutions impregnated on one side and the other reagent on the other side of the same area of the carrier material. The two reagent solutions are applied to the bibulous carrier material separately, allowing drying between applications to prevent premature mixing of the reagents prior to wetting during the performance of the test.

Zone C reagent solution is prepared from a 10 ml. distilled water solution of:

(1) from about 0.1 to 4 g., preferably about 0.2 to 2 g. of an alkali metal salt of an amino-substituted-naphthalene sulfonic acid; and (2) from about 0.16 to 7 g., preferably about 0.3 to 4 g. of an alkali metal salt of sulfanilic acid.

The pH of the final solution of Zone C reagent is adjusted to from about 7 to 12, preferably from about 9.8 to 10, with a suitable pH modifying agent which will not interfere with the diagnostic test, such as a sodium, potassium, or ammonium hydroxide; preferably a 0.1 N sodium hydroxide solution is used. In the preferred embodiment of the invention, an interim pH adjustment is conveniently made on an aqueous solution of the alkali metal salt of the amino-substituted-naphthalene sulfonic acid, using a sufficient amount of a pH modifying agent (preferably 1 N sodium hydroxide) to adjust this solution to a pH of from about 7 to 12, preferably about 9.5 to 10. Thereafter, the sulfanilic acid salt is added and the solution is brought to a volume of 100 ml. and the final pH adjustment is made.

Zone D Reagent solution is prepared from a solution of from about 20 to 65 g., and preferably about 35 to 60 g. in 100 ml. of distilled water of at least one of the crystalline acids such as oxalic, malonic or citric acid. The Zone D Reagent solution described is preferably applied to the reverse side of that portion of the reagent zone on the carrier material which carries the Zone C reagent solution.

Each of the above Zone A, C and D solutions are applied to the bibulous material so as to provide on each individual diagnostic test product, the following amounts of ingredients, in dried form:

|  | Broad range in mg. | Narrow range in mg. |
|---|---|---|
| Zone A nutrient medium | 1.4–4.6 | 2–4 |
| Zone C reagent solution: |  |  |
| Naphthalene sulfonic acid | 0.005–0.2 | 0.01–0.1 |
| Sulfanilic acid | 0.008–0.36 | 0.015–0.2 |
| Zone D reagent solution | 1–4.5 | 2–4 |

Optionally, one end of the impregnated test strip may contain additional zones to prevent the contamination of the nitrate medium and reagent zones through handling. For example, there may be present adjacent to the outermost reagent zone at one end of the strip, an additional barrier zone hereinafter designated Zone $B_2$ hydrophobic barrier, further, a dyed identification zone hereinafter designated Zone E Dye may be present contiguous to barrier Zone $B_2$ Barrier, or separated from this second barrier zone by an untreated area.

The previously described Zone $B_1$ hydrophobic barrier composition is also suitable for use as the Zone $B_2$ hydrophobic barrier.

Any suitable dye which will color the bibulous material sufficiently to distinguish the end of the diagnostic test strip which is to be handled from the colorless reagent zones which are to be inserted into the culture under investigation may be used. About 0.025 to 0.3 g. of a dye, dissolved in a suitable solvent and adjusted to a volume of 100 ml. has been found to provide a suitable solution which, when dried, forms Zone E identifying dye. The preferred dye solution is prepared from Brilliant Green, a biological stain (Matheson, Coleman and Bell) which is soluble in water. However, many other dye solutions would be equally effective, for instance Methyl Green (National Aniline).

The bibulous materials suitable as the carrier for the diagnostic composition of this invention are those materials which, by means of capillary action, are able to hold liquid. Such materials include filter paper, felt, porous ceramic strips, woven or matted glass fiber and the like. A particularly preferred paper is Eaton-Dikeman No. 623 (70 lbs.).

In the preferred embodiment of the invention, a single diagnostic composition, as pictured in the accompanying FIG. 1 of the drawings contains a dried form of the following:

(Area 1) Zone A: About 2.8 mg. of nitrate broth prepared from beef extract, peptone and potassium nitrate;

(Area 2) Zone $B_1$: Saturated with a solution of about 85 ml. of a methyl methacrylate resin coating composition and about 15 ml. of ethyl alcohol;

(Area 3) Zone C: About 0.05 mg. of 5-amino-1-naphthalene sulfonic acid and about 0.08 mg. of the sodium salt of sulfanilic acid;

(Area 3) Zone D: About 3 mg. of citric acid;

(Area 4) Zone $B_2$: Totally saturated with the Zone $B_1$ solution;

(Area 5): Untreated area;

(Area 6) Zone E: Visibly colored by the application of a 100 ml. aqueous solution of 0.1 g. of Brilliant Green.

In the embodiment shown in FIG. 2 of the drawings, an alternate diagnostic composition is prepared wherein the bibulous carrier material contains dried Zone C and Zone D reagent solutions, and optionally, dried hydrophobic barrier composition Zone $B_1$ and a dried Zone E Dye. The composition of Zones C, D, $B_1$ and E in this alternate embodiment are the same as described above for the embodiment shown in FIG. 1 of the drawings. In both embodiments, the two reagent zones are positioned adjacent to each other on the individual diagnostic test product, either in a side-by-side relationship on the same side of the carrier material, or preferably, positioned back-to-back with one of the reagent solutions impregnated on one side and the other reagent on the other side of the same area of the carrier material. The two reagent solutions are applied to the bibulous carrier material separately allowing drying between applications to prevent premature mixing of the reagents prior to wetting during the performance of the test. The diagnostic composition of this invention is stable for at least 12 months at 4° C. and at room temperature.

To determine the reduction of nitrate to nitrite by a particular micro-organism using the diagnostic composition of FIG. 1 of this invention, a loopful of the culture to be tested is suspended in 0.3 ml. of saline in a 13 x 100 mm. or similar size test tube. The diagnostic composition test strip of this invention is inserted in the tube in such a manner that the Zone A nitrate medium is immersed in the test suspension. The tube is incubated at from 35° to 37° for about 1½ to 2 hours. The tube is then tipped to wet the reagent zone areas and the development of a pink to red color in the reagent zone in 30 seconds to 10 minutes indicates a positive result, i.e., that nitrate has been reduced to nitrite. No color change or a light buff color indicates a negative test.

The diagnostic composition of this invention will detect the presence of about 1 µg. of nitrite ion present in 0.3 ml. suspension of a culture to be tested.

The diagnostic composition (as pictured in FIG. 1 of the drawings) and procedure of this invention was compared with the results obtained using classical method of Edwards and Ewing ("Identification of Enterobacteriaceae," P. R. Edwards and W. H. Ewing, Burgess Pub. Co. 1962, printed 1964).

A total of 107 organisms were tested. Results are listed in Table I below. 106 of the cultures gave the same reaction with both procedures, a correlation of better than 99%.

TABLE I

| Organisms | No. tested | Strip and broth positive | Strip and broth negative | Disagreement |
|---|---|---|---|---|
| Gram+ | 32 | 26 | 6 | None |
| Gram− (Enterobacteriaceae) | 52 | 51 | 0 | 1 [1] |
| Gram− (other) | 23 | 13 | 10 | None |
| Totals | 107 | 90 | 16 | + 1 |

[1] Strip—broth weak.

To determine the presence of nitrite, the diagnostic test composition of this invention, as pictured in FIG. 2 of the drawings, is utilized as follows: reagent zones positioned in area 1 of the diagnostic composition as shown in FIG. 2 are immersed in the urine sample and then withdrawn. The development of a pink to red color on the reagent zones of the paper strip in 30 seconds to 10 minutes indicates the positive presence of nitrite in the urine sample. No color change or a light buff color indicates that no nitrile is present. Since urine normally contains nitrates, the presence of nitrites in urine indicates that the bacteria are present and have reduced the nitrate to nitrite. Hence, this diagnostic composition (FIG. 2) provides a rapid and easy-to-use method of detecting bacteriuria.

In a similar fashion, as described above, the diagnostic composition of FIG. 2 of this invention may be used to detect the presence of minute quantities of nitrites in other fluids, including industrial fluids, where the presence or absence of the nitrite group is critical to some processing technique.

The following examples are included to further illustrate this invention:

EXAMPLE 1

(A) Preparation of Zone A nitrate medium solution

To 60 ml. of distilled water, add 20 g. of Bacto-Nitrate Broth, dehydrated (Difco). Mix well, and adjust volume to 100 ml. with distilled water. Heat to 100° C., and boil briefly to obtain a clear solution, then cool to 25° C. Use for application to test strip within two hours of preparation.

(B) Preparation of Zone $B_1$ and Zone $B_2$ hydrophobic barrier composition

Dilute 85 ml. of Krylon 150 Crystal Clear with 15 ml. of 95% ethanol, USP.

(C) Preparation of the Zone C reagent solution, amino-substituted naphthalene sulfonic acid and sulfanilic acid salt To 50 ml. of distilled water, add 1 g. of the sodium salt of 5-amino-1-naphthalene sulfonic acid. Slowly add, with mixing 1 N sodium hydroxide solution until a stable pH of 9.5–10 is obtained. Add 1.6 g. of sulfanilic acid, sodium salt, mix to dissolve and adjust to a pH of 9.8–10 with 0.1 N NaOH solution. Adjust volume to 100 ml. with distilled water and mix.

(D) Preparation of the Zone D reagent solution, citric acid

To 50 g. citric acid, add sufficient distilled water to obtain a final volume of 100 ml. Mix and warm as necessary to dissolve.

(E) Preparation of Zone E, dye solution

Dissolve 0.1 g. Brilliant Green, biological stain (Matheson, Coleman & Bell) in distilled water, adjust volume to 100 ml. with distilled water and mix.

EXAMPLE 2

Preparation of the diagnostic composition of FIG. 1 in the drawings

In producing the strips, a continuous sheet of Eaton-Dikeman Filter Paper No. 623 (70 lbs.), 83 mm. in width, is employed. The paper is divided into six separate areas as shown in the accompanying drawing.

Apply the Zone B hydrophobic barrier solution of Example 1 to areas 2 and 4 in amounts sufficient to saturate the paper and allow to dry. Apply the Zone A nitrate medium solution of Example 1 to area 1, once to each side of the paper and allow to dry. Apply the Zone E dye solution of Example 1 to area 6 once to each side of the paper and allow to dry. Apply Zone C reagent solution of Example 1 to one side of area 3, limiting the amount applied so that no more than one-half the thickness of the paper is wet. Allow to dry. Apply Zone D reagent solution of Example 1 to the reverse side of area 3 so that no more than one-half the thickness of the paper is wet. The reagent solutions must be applied carefully in order that Zone C reagent solution does not mix with Zone D reagent solution. After all areas of the paper have dried thoroughly, cut into ¼ inch (6.3 mm.) strips, each containing the 6 areas impregnated with solutions herein described. Generally, the nitrate broth is applied to the paper at a rate of 0.70 ml. for each 30 cm. of length with the sulfanilic acid and the 5-amino-naphthalene sulfonic acid being applied at a rate of 0.25 ml. and the citric acid solution being applied at a rate of 0.3 ml. per 30 cm.

EXAMPLE 3

Use of the diagnostic composition of FIG. 1 of the drawings: Method of use (1) Suspend a loopful of culture from an agar medium in 0.3 ml. of saline in a 13 x 100 mm. or similar size tube.

(2) Add the diagnostic composition test strip prepared according to Examples 1 and 2 to the suspension so that the zone *opposite* the green marker zone is immersed.

(3) Incubate the tube in a water bath for two hours at 35°–37° C.

(4) Tip the tube to wet the reagent zone. Development of a pink to red color in the reagent zones in 30 seconds to 10 minutes indicates a positive test. No color change or a light buff color indicates a negative test.

EXAMPLE 4

(A) Preparation of Zone A nitrate medium solution

To 60 ml. of distilled water, add 27 g. of Bacto-Nitrate broth, dehydrated (Difco). Mix well, and adjust volume to 100 ml. with distilled water. Heat to 100° C. and boil briefly to obtain a clear solution, then cool to 25° C. Use within two hours of preparation.

(B) Preparation of Zone $B_1$ and Zone $B_2$ hydrophobic barrier solution

Dilute 85 ml. of Krylon 150 Crystal Clear with 15 ml. of toluene.

(C) Preparation of the Zone C reagent solution, amino-substituted naphthalene sulfonic acid and sulfanilic acid salt To 50 ml. of distilled water, add 1 g. of 8-amino-2-naphthalene sulfonic acid. Slowly add, with mixing, 1.0 N sodium hydroxide solution until a stable pH of 9.5–10 is obtained. Add 1.6 g. of sulfathiazole, sodium salt, mix to dissolve and adjust to a pH of 9.8–10 with 0.1 N NaOH solution. Adjust volume to 100 ml. with distilled water and mix.

(D) Preparation of the Zone D reagent solution, malonic acid

To 50 g. malonic acid, add sufficient distilled water to obtain a final volume of 100 ml. Mix and warm as necessary to dissolve.

(E) Preparation of Zone E, dye solution

Dissolve 0.1 g. Methyl Green (National Aniline) in distilled water, adjust volume to 100 ml. with distilled water and mix.

EXAMPLE 5

Preparation of the diagnostic composition of FIG. 1 of the drawings

Apply the Zone A, B, C, D and E solutions, prepared according to Example 4 to the bibulous material carrier as described in Example 2.

EXAMPLE 6

Use of the diagnostic composition of FIG. 1 of the drawings

Follow the procedure of Example 3, using the diagnostic composition test strip prepared according to Examples 4 and 5.

EXAMPLE 7

Preparation of the diagnostic composition of FIG. 2 of the drawings

In producing the strips, a continuous sheet of Eaton-Dikeman Paper No. 623 (70 lbs.) 83 mm. in width is employed. The paper is divided into four separate areas as shown in the accompanying FIG. 2 of the drawings.

Apply Zone B hydrophobic barrier solution of Example 1 to area 2 in amounts sufficient to saturate the paper and allow to dry. Apply the Zone E dye solution of Example 1 to area 4, once to each side of the paper and allow to dry. Apply Zone C reagent solution of Example 1 to one side of area 1, limiting the amount applied so that no more than one-half the thickness of the paper is wet. Allow to dry. Apply Zone D reagent solution of Example 1 to the reverse side of area 1 so that no more than one-half the thickness of the paper is wet. The reagent solutions must be applied carefully in order that Zone C reagent solution does not mix with Zone D reagent solution. After all areas of the paper have dried thoroughy, cut into ¼ inch (6.3 mm.) strips, each containing the four areas impregnated with solutions herein described. Generally, the sulfanilic acid and the 5-amino-naphthalene sulfonic acid salts are applied at a rate of 0.25 ml. per 30 cm. of paper length; the citric acid solution is applied at a rate of 0.3 ml. per 30 cm. of paper length.

EXAMPLE 8

Use of the diagnostic composition of FIG. 2 of the drawings

Add the diagnostic composition of Example 7 to the test sample of urine so as to wet the reagent zones opposite the green marker zone by immersing the two reagents in the urine sample and then withdraw the paper strip diagnostic composition. The development of a pink to red color on the reagent zones of the paper strip in 30 seconds to 10 minutes indicates a positive test. No color change or a light buff color indicates a negative test.

We claim:

1. A diagnostic composition for the detection of nitrite, which comprises a bibulous material containing at least two impregnated zones, one of which, Zone C, contains:

(A) an alkali metal salt of an amino-substituted-naphthalene sulfonic acid selected from the group consisting of 5-amino-2-naphthalene-sulfonic acid, 8-amino-2-naphthalene-sulfonic acid, and 5-amino-1-naphthalene-sulfonic acid, and (B) a reagent selected from the group consisting of an alkali metal salt of sulfanilic acid, sulfadiazine and an alkali metal salt of sulfathiazole;

and the second of which, Zone D, contains at least one crystalline acid selected from the group consisting of citric acid, oxalic acid and malonic acid; said zones being arranged in an order which will promote the development of color in the reagent Zones C and D to detect the presence of nitrite.

2. A diagnostic composition according to claim 1 wherein Zone C contains:

(A) from about 0.005 to about 0.2 mg. of an alkali metal salt of an amino-substituted-naphthalene sulfonic acid selected from the group consisting of 5-amino-2-naphthalene-sulfonic acid, 8-amino-2-naphthalene-sulfonic acid, and 5-amino-1-naphthalene-sulfonic acid, and (B) from about 0.008 to about 0.36 mg. of a reagent selected from the group consisting of an alkali metal salt of sulfanilic acid, sulfadiazine, and an alkali metal salt of sulfathiazole;

and Zone D contains from about 1 to about 4.5 mg. of at least one crystalline acid selected from the group consisting of citric acid, oxalic acid and malonic acid.

3. A diagnostic composition according to claim 2, wherein a barrier Zone B is positioned contiguous to the outermost reagent impregnated zone, said Zone B being impregnated with a sufficient amount of a dried, inert, hydrophobic barrier composition to saturate Zone B.

4. A diagnostic composition according to claim 3 wherein Zone B is impregnated with a sufficient amount of a dried inert hydrophobic barrier composition to saturate Zone B, said hydrophobic barrier composition comprising:

an acrylic coating composition and, optionally,
a diluent therefor.

5. A diagnostic composition according to claim 3, wherein an additional Zone E, positioned at one end of the diagnostic composition, contains a sufficient amount of a dried identifying dye to color Zone E, said additional Zone E being positioned at the end opposite the reagent Zones C and D.

6. A diagnostic composition according to claim 1 wherein Zone C contains:

(A) from about 0.01 to about 0.1 mg. of an alkali metal salt of an amino-substituted-naphthalene sulfonic acid selected from the group consisting of 5-amino-2-naphthalene-sulfonic acid, 8-amino-2-naphthalene-sulfonic acid, and 5-amino-1-naphthalene-sulfonic acid, and (B) from about 0.015 to about 0.2 mg. of a reagent selected from the group consisting of alkali metal salt of sulfanilic acid, sulfadiazine, and an alkali metal salt of sulfathiazole;

and Zone D contains from about 2 to about 4 mg. of at least one crystalline acid selected from the group consisting of citric acid, oxalic acid, and malonic acid.

7. A diagnostic composition according to claim 6 wherein a barrier Zone B is positioned contiguous to the outermost reagent impregnated zone, said Zone B being impregnated with a sufficient amount of a dried, inert, hydrophobic barrier composition to saturate Zone B.

8. A diagnostic composition according to claim 7 wherein Zone B is impregnated with a sufficient amount of a dried inert hydrophobic barrier composition to saturate Zone B, said hydrophobic barrier composition comprising:

an acrylic coating composition and, optionally,
a diluent therefor.

9. A diagnostic composition according to claim 8, wherein an additional Zone E, positioned at one end of the diagnostic composition, contains a sufficient amount of a dried identifying dye to color Zone E, said additional Zone E being positioned at the end opposite the reagent Zones C and D.

10. A diagnostic composition for the detection of nitrite comprises a bibulous material impregnated with at least two zones, one of which, Zone C, contains:

(A) about 0.05 mg. of the sodium salt of 5-amino-1-naphthalene sulfonic acid, and (B) about 0.08 mg. of the sodium salt of sulfanilic acid;

and the second of which, Zone D, contains about 3 mg. of citric acid; said Zone C and said Zone D being positioned in a back-to-back relationship to each other, on one end of the bibulous material.

11. A diagnostic composition according to claim 10 wherein a barrier Zone B is positioned contiguous to Zones C and D, said Zone B being impregnated with a sufficient amount of a dried, inert, hydrophobic barrier composition to saturate Zone B, said hydrophobic barrier composition comprising a methyl methacrylate coating composition.

12. A diagnostic composition according to claim 11, wherein an additional Zone E, positioned at one end of the diagnostic composition, contains a sufficient amount of a dried identifying dye to color Zone E, said additional Zone E being positioned at the end opposite the reagent Zones C and D.

References Cited

UNITED STATES PATENTS

| | | | |
|---|---|---|---|
| 3,341,427 | 9/1967 | Evans et al. | 195—103.5 R |
| 3,378,346 | 4/1968 | Watson et al. | 195—103.5 RX |
| 3,547,780 | 12/1970 | Finnerty | 23—253 TPX |

OTHER REFERENCES

Welcher: "Organic Analyt. Reagents," vol. IV, pp. 574–583 (1948).

A. LOUIS MONACELL, Primary Examiner

M. D. HENSLEY, Assistant Examiner

U.S. Cl. X.R.

195—103.5 R